(12) United States Patent
Nakagawa

(10) Patent No.: US 12,726,886 B2
(45) Date of Patent: Sep. 1, 2026

(54) COMMUNICATION SYSTEM, MASTER STATION, AND COMMUNICATION METHOD

(71) Applicant: SHARP KABUSHIKI KAISHA, Sakai City (JP)

(72) Inventor: Katsuya Nakagawa, Sakai City (JP)

(73) Assignee: SHARP KABUSHIKI KAISHA, Sakai City (JP)

( * ) Notice: Subject to any disclaimer, the term of this patent is extended or adjusted under 35 U.S.C. 154(b) by 707 days.

(21) Appl. No.: 18/099,140

(22) Filed: Jan. 19, 2023

(65) Prior Publication Data

US 2023/0247534 A1 Aug. 3, 2023

(30) Foreign Application Priority Data

Feb. 3, 2022 (JP) ................................. 2022-015593

(51) Int. Cl.
*H04W 48/16* (2009.01)
*H04B 17/318* (2015.01)
*H04W 24/10* (2009.01)

(52) U.S. Cl.
CPC .......... *H04W 48/16* (2013.01); *H04B 17/318* (2015.01); *H04W 24/10* (2013.01)

(58) Field of Classification Search
CPC ..... H04W 48/16; H04W 24/10; H04B 17/318
USPC ........................................................ 370/329
See application file for complete search history.

(56) References Cited

U.S. PATENT DOCUMENTS

2004/0066768 A1 4/2004 Yeh et al.
2019/0072638 A1 * 3/2019 Wang .................... H04W 4/029

FOREIGN PATENT DOCUMENTS

JP 2004-129235 A 4/2004

* cited by examiner

*Primary Examiner* — Chuck Huynh
(74) *Attorney, Agent, or Firm* — ScienBiziP, P.C.

(57) ABSTRACT

A communication system includes a management server, a plurality of master stations, and a plurality of slave stations, where a first slave station transmitting a search signal identifying a first master station which corresponds to the first slave station, each of the plurality of master stations, when having received the search signal, transmitting a report to the management server, the report including identification information of the master station, identification information of the first slave station, and signal information related to the search signal, and the management server determining the first master station, from among the plurality of master stations, which corresponds to the first slave station, based on a plurality of the reports respectively received from the plurality of master stations, and associating the first slave station and the first master station with each other.

11 Claims, 17 Drawing Sheets

| TAG ID | POSITION INFORMATION | PART'S NAME |
| --- | --- | --- |
| tg0001 | p1 | A1 |
| tg0002 | p2 | A2 |
| tg0003 | p3 | A3 |
| ⋮ | ⋮ | ⋮ |
| tg0500 | p500 | A500 |

| CONTROLLER ID | TAG ID |
| --- | --- |
| c0001 | tg0001～tg0100 |
| c0002 | tg0101～tg0200 |
| c0003 | tg0201～tg0300 |
| c0004 | tg0301～tg0400 |
| c0005 | tg0401～tg0500 |

FIG. 6

TAG
TAG
TAG
AR1
TAG
CONTROLLER A
TAG
TAG
TAG
TAG

TAG
TAG
TAG
AR2
TAG
CONTROLLER B
TAG
TAG
TAG
TAG

LESS THAN 40 ms
TRANSMISSION DATA
HEADER
DESTINED TO TAG 1
DESTINED TO TAG 2
DESTINED TO TAG 3
DESTINED TO TAG 4
DESTINED TO TAG 5
CRC
TAG DATA RECEPTION PERIOD R1
RESPONSE RECEPTION
TAG DATA RECEPTION
TAG 1
TAG 2
TAG 3
TAG 4
TAG 5
TAG x
TRANSMISSION DATA (COMMAND) RECEPTION
ACKNOWLEDGEMENT
Ramdom Back Off
DATA TRANSMISSION

FIG. 12

| | | FREQUENCY CHANNEL | | | | |
|---|---|---|---|---|---|---|
| | | 1 | 2 | 3 | 4 | 5 |
| SLOT NUMBER | 1 | 1 | 15 | 30 | 39 | 53 |
| | 2 | 2 | 16 | 31 | 40 | 54 |
| | 3 | 3 | 17 | 32 | 41 | 55 |
| | 4 | 4 | 18 | 33 | 42 | 56 |
| | 5 | 5 | 19 | 34 | 43 | 57 |
| | 6 | 6 | 20 | 35 | 44 | 58 |
| | 7 | 7 | 21 | 36 | 45 | 59 |
| | 8 | 8 | 22 | 37 | 46 | 60 |
| | 9 | 9 | 23 | 38 | 47 | 61 |
| | 10 | 10 | 24 | 39 | 48 | 62 |
| | 11 | 11 | 25 | | 49 | 63 |
| | 12 | 12 | 26 | | 50 | 64 |
| | 13 | 13 | 27 | | 51 | |
| | 14 | 14 | 28 | | 52 | |
| | 15 | | 29 | | | |
| | 16 | | | | | |

COMMUNICATION SYSTEM, MASTER STATION, AND COMMUNICATION METHOD

INCORPORATION BY REFERENCE

This application is based upon and claims the benefit of priority from the corresponding Japanese Patent Application No. 2022-015593 filed on Feb. 3, 2022, the entire contents of which are incorporated herein by reference.

BACKGROUND

The present disclosure relates to a communication system, a master station, a slave station, a communication method, and a recording medium recording therein a communication program.

Such a communication scheme (time division multiple access: TDMA) has been known, in which one master station (also referred to as "controller" or "host") occupies a single channel, and sequentially communicates with a plurality of slave stations (also referred to as "slave") allocated to the master station, in a time-division manner. Each slave station is allocated with a certain time which is immediately after reception of communication (transmission data) from the master station, as a time communicable with a host.

In factories and warehouses, etc., operators perform picking operations to pick articles stored in storage shelves. A picking system to optimize the picking operations has been introduced. In the picking system, a plurality of storage shelves, a slave station (tag having a communication function) provided for each storage shelf, and a master station (controller) to control the plurality of tags are provided in an operation area. The controller transmits a command (which may include a lighting instruction) to a tag of a storage shelf in which an article to be picked is stored, and lights a lamp (LED) provided for the tag. An operator picks a target article from the storage shelf whose lamp button is lit.

In the aforesaid picking system, in order to construct a multitude of star topology networks, each made up of a master station and a plurality of slave stations, each of the plurality of slave stations has to be associated with a specific master station in which communication is stable. However, with the conventional techniques, the slave station has to go through many procedures, and it has not been easy to associate a master station and a plurality of slave stations with each other.

An object of the present disclosure is to provide a communication system, a master station, a slave station, a communication method, and a recording medium recording therein a communication program, according to which a master station and a plurality of slave stations can be associated with each other by a simple configuration.

SUMMARY

According to an embodiment of the present disclosure, a communication system includes a management server, a plurality of master stations, and a plurality of slave stations. A first slave station transmits a search signal identifying a first master station which corresponds to the first slave station. Each of the plurality of master stations, when having received the search signal, transmits a report to the management server, the report including identification information of the master station, identification information of the first slave station, and signal information related to the search signal. The management server determines the first master station, from among the plurality of master stations, which corresponds to the first slave station, based on a plurality of the reports respectively received from the plurality of master stations, and associates the first slave station and the first master station with each other.

According to an embodiment of the present disclosure, a master station communicates with a management server and with a plurality of slave stations. When having received a search signal transmitted from the first slave station to identify a master station which corresponds to the first slave station, the master station transmits, to the management server, a report including identification information of the master station, identification information of the first slave station, and signal information related to the search signal.

According to an embodiment of the present disclosure, a slave station communicates with a management server and with a plurality of master stations. When having received a search instruction, the slave station transmits a search signal identifying a master station which corresponds to the slave station, to the plurality of master stations by using a channel different from a channel to receive a beacon transmitted from a master station.

In a communication method according to an embodiment of the present disclosure, a management server, a plurality of master stations, and a plurality of slave stations wirelessly communicate. The communication method causes one or a plurality of processors to perform: in a first slave station, transmitting a search signal identifying a first master station which corresponds to the first slave station; in each of the plurality of master stations, when the search signal has been received, transmitting a report to the management server, the report including identification information of the master station, identification information of the first slave station, and signal information related to the search signal; and in the management server, determining the first master station, from among the plurality of master stations, which corresponds to the first slave station, based on a plurality of the reports respectively received from the plurality of master stations, and associating the first slave station and the first master station with each other.

A recording medium according to an embodiment of the present disclosure records therein a communication program by which a management server, a plurality of master stations, and a plurality of slave stations wirelessly communicate. The communication program causing one or a plurality of processors to perform: in a first slave station, transmitting a search signal identifying a first master station which corresponds to the first slave station; in each of the plurality of master stations, when the search signal has been received, transmitting a report to the management server, the report including identification information of the master station, identification information of the first slave station, and signal information related to the search signal; and in the management server, determining the first master station, from among the plurality of master stations, which corresponds to the first slave station, based on a plurality of the reports respectively received from the plurality of master stations, and associating the first slave station and the first master station with each other.

The present disclosure provides a communication system, a master station, a slave station, a communication method, and a recording medium recording therein a communication program, according to which a master station and a plurality of slave stations can be associated with each other by a simple configuration.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 4 illustrates an example of tag information stored in a storage of the communication system, according to an embodiment of the present disclosure.

FIG. 5 illustrates an example of association information stored in the storage of the communication system, according to an embodiment of the present disclosure.

FIG. 6 illustrates a correspondence relationship between controllers and tags, according to an embodiment of the present disclosure.

FIG. 12 illustrates how each of a plurality of controllers is allocated to a respective channel and temporal interval, according to an embodiment of the present disclosure.

DETAILED DESCRIPTION

Hereinafter, the embodiments of the present disclosure are described with reference to the accompanying drawings. The following embodiments are examples in which the present disclosure are embodied, but, in nature, do not limit the technical scope of the present disclosure.

First Embodiment

Figure 1:
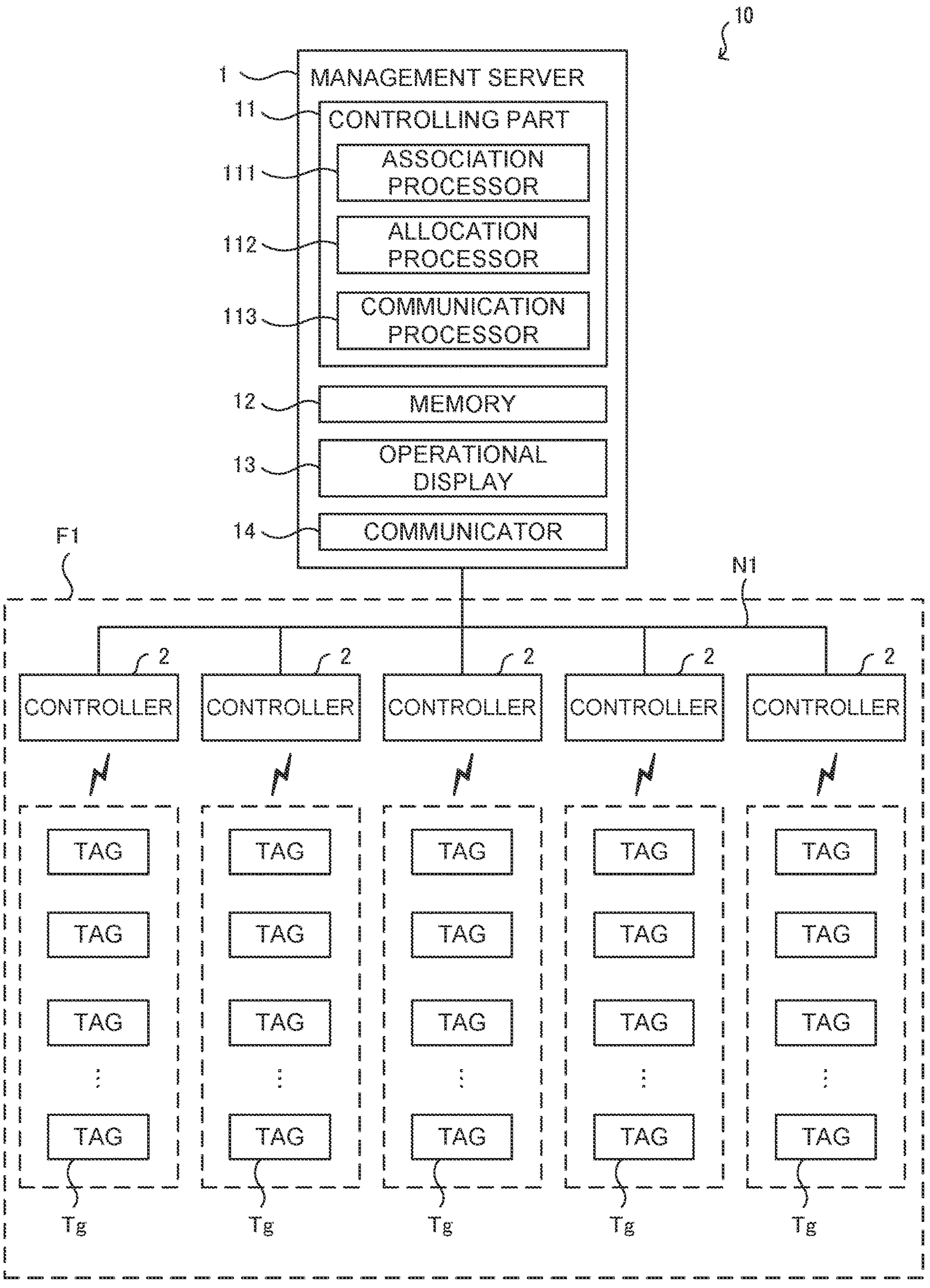
FIG. 1 is a functional block diagram illustrating an overall configuration of a communication system according to a first embodiment of the present disclosure.

FIG. 1 is a functional block diagram illustrating an overall configuration of a communication system 10 according to a first embodiment of the present disclosure.

Figure 2:
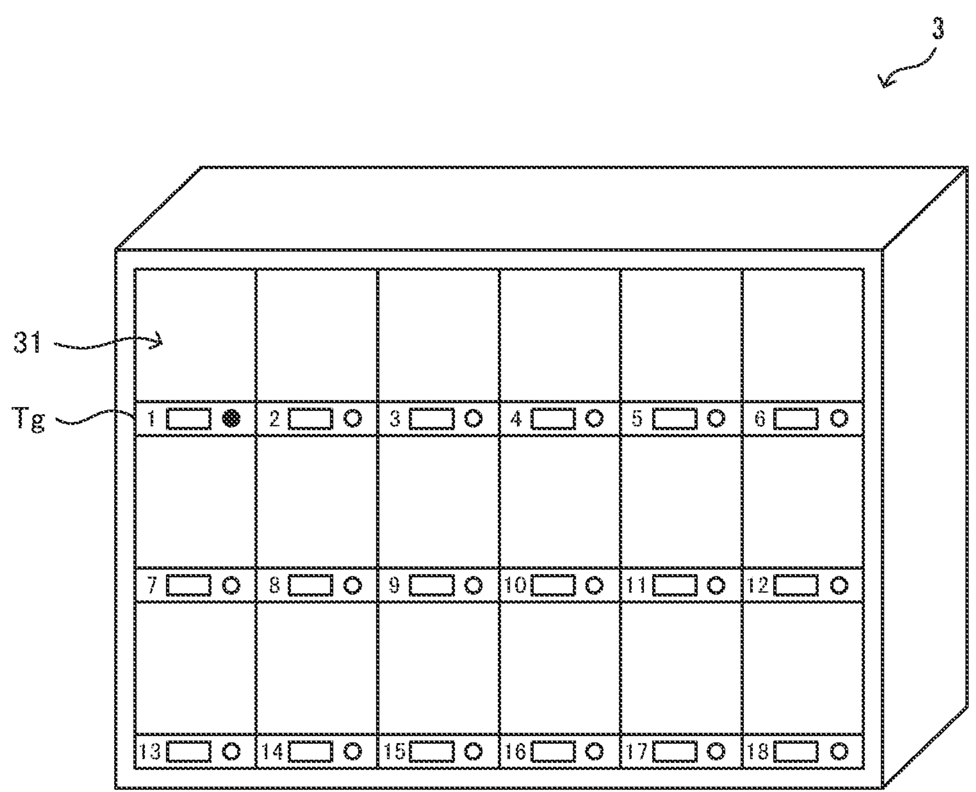
FIG. 2 is an external view of a storage shelf according to an embodiment of the present disclosure.

The communication system 10 includes a management server 1, a controller 2, and a tag Tg. For example, the communication system 10 is introduced in a work site (such as factory and warehouse) where an operator picks a target article from a storage shelf 3 (refer to FIG. 2) storing articles. The articles are not particularly limited, and include articles of various fields, such as parts, retail goods, drugs, books, documents, and miscellaneous goods. In the present embodiment, parts used in assembling a predetermined product (such as vehicle and electric appliance) are taken as an example of the articles. In other words, the communication system 10 in the present embodiment is introduced in a facility F1 (such as factory) where an operator picks a target article from the storage shelf 3 storing such parts.

Figure 3A:
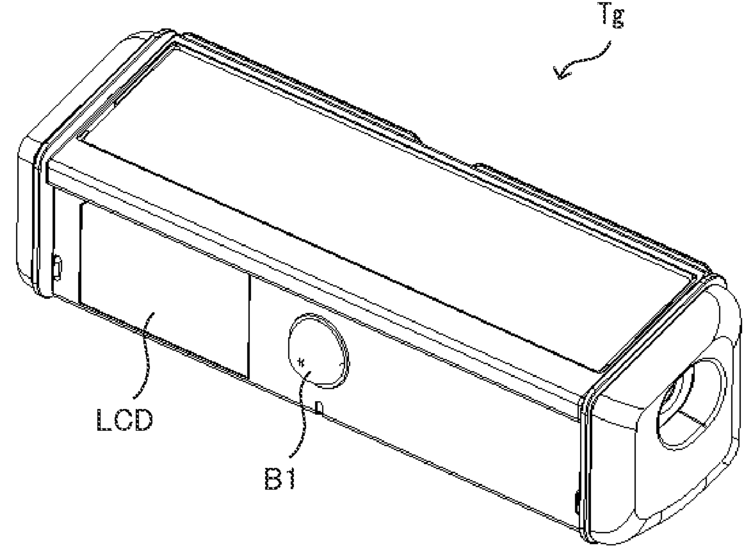
FIG. 3A illustrates a configuration of a tag provided for a storage shelf according to an embodiment of the present disclosure.

The management server 1 and a controller 2 are connected to each other via a network N1. The network N1 is a communication network such as the Internet, a local area network (LAN), a wide area network (WAN), or a public telephone line. A controller 2 and a tag Tg are connected to each other in the present communication method which utilizes radio waves. The tag Tg is provided in each storage space 31 (refer to FIG. 2) of the storage shelf 3. As illustrated in FIG. 3A, a tag Tg includes a display (LCD) displaying a part's name, etc.; a lamp button B1 for lighting, flashing, and lighting out in a plurality of colors; and a communicator (not illustrated) communicating with the controller 2. The lamp button B1 has a button function, as a user interface. The tag Tg can cause a display to display predetermined information and cause the lamp button B1 to perform lighting and lighting out, according to an instruction (transmission data) from the controller 2. For example, the operator picks a part from the storage space 31 in which the tag Tg, whose lamp button B1 is lit, is provided. The tag Tg notifies the controller 2 in the present communication scheme that the lamp button B1 has been pushed, and the controller 2 notifies the management server 1 thereof. If the tag Tg corresponds to an intended part, the management server 1 sends, using the present communication scheme and via the controller 2, a signal to a tag Tg corresponding to a part to be taken out next, to prompt the lamp button B1 of the tag Tg to flash in a predetermined cycle. FIG. 3A illustrates a state in which a tag 1 is lit. The management server 1 collectively controls the controllers 2, and outputs, to a predetermined controller 2, a transmission instruction to transmit transmission data (such as a lighting instruction for lighting a tag Tg), based on the information on a target to be picked.

A plurality of storage shelves 3 are provided in the facility F1. A plurality of controllers 2 are dispersed in the facility F1, and the plurality of the controllers 2 communicate with the tags Tg in the plurality of storage shelves 3 provided in the facility F1. In this way, the communication system 10 constructs a picking system of the facility F1, by causing the plurality of controllers 2 to control the plurality of tags Tg provided in the facility F1. Specifically, the communication system 10 is a system managing so that radio wave communication between the plurality of controllers 2 and the plurality of tags Tg is performed in a predetermined cycle.

The management server 1 functions as a mediating station that manages and controls the controllers 2, each controller 2 functions as a host device, and each tag Tg functions as a slave device. The controller 2 is an example of a master station according to the present disclosure, and the tag Tg is an example of a slave station according to the present disclosure.

Management Server 1

As illustrated in FIG. 1, the management server 1 includes a controlling part 11, a memory 12, an operational display 13, and a communicator 14, or the like. For example, the management server 1 may be an information processor such as a personal computer. The management server 1 may also be configured by a cloud server.

The communicator 14 connects the management server 1 to the network N1, in a wired or wireless manner, and performs data communication with the controller 2 via the network N1, according to a predetermined communication protocol.

The operational display 13 is a user interface that includes a display, such as a liquid crystal display and an organic electro-luminescence (EL) display, which displays various types of information; and an operation acceptor, such as a touch panel, a mouse, or a keyboard, to be operated.

The memory 12 is a non-volatile memory, such as a hard disk drive (HDD), a solid state drive (SSD), and a flash memory, for storing various types of information. The memory 12 stores such data as tag information D1 and association information D2.

FIG. 4 illustrates an example of tag information D1. The tag information D1 has recorded therein information related to all the tags Tg provided in the facility F1. Specifically, the tag information D1 includes such information as a tag ID, position information, a part's name, etc. The tag ID is identification information of a tag Tg. The position information is information on a position in which a tag Tg is provided, which is, for example, information on a position of the storage shelf 3, a shelf number allocated to the storage shelf 3 (storage space 31), and coordinates of the facility F1 on a map. The part's name is a name of a part stored in the storage space 31 provided with the tag Tg.

The tag information D1 is registered by a manager of the facility F1, for example. The tag information D1 may be stored in a server different from the management server 1.

FIG. 5 illustrates an example of association information D2. The association information D2 is information to identify tags Tg associated with each of the plurality of controllers 2. Specifically, the association information D2 includes information such as a controller ID and a tag ID. The controller ID is identification information for identifying a controller 2, and the tag ID is identification information for identifying tags Tg. Note that, in reality, the most stable tags Tg in communication are associated with each controller 2, and therefore, the IDs of the tags Tg do not have any regularity but are random.

Figure 6:
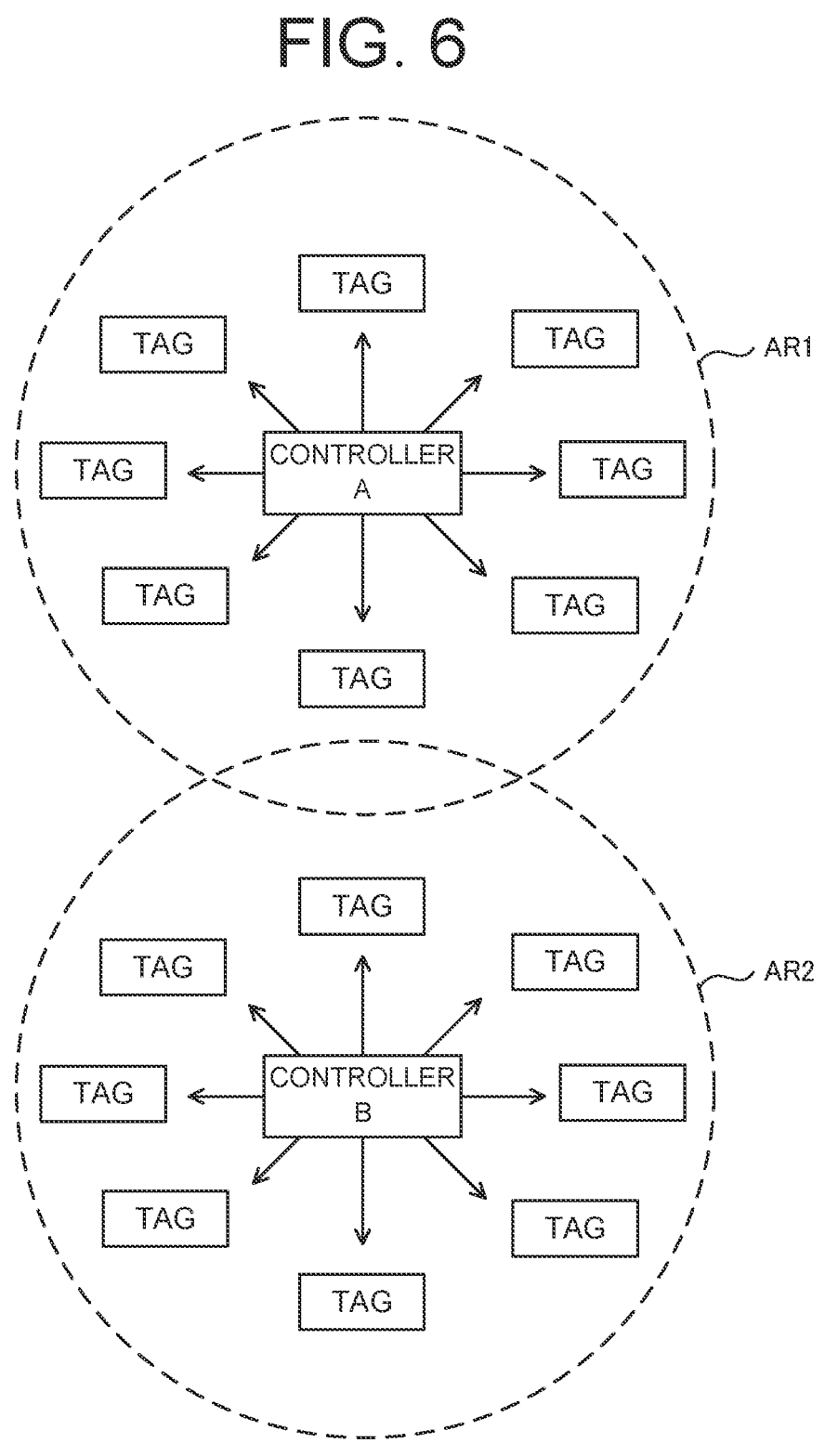
Figure 11:
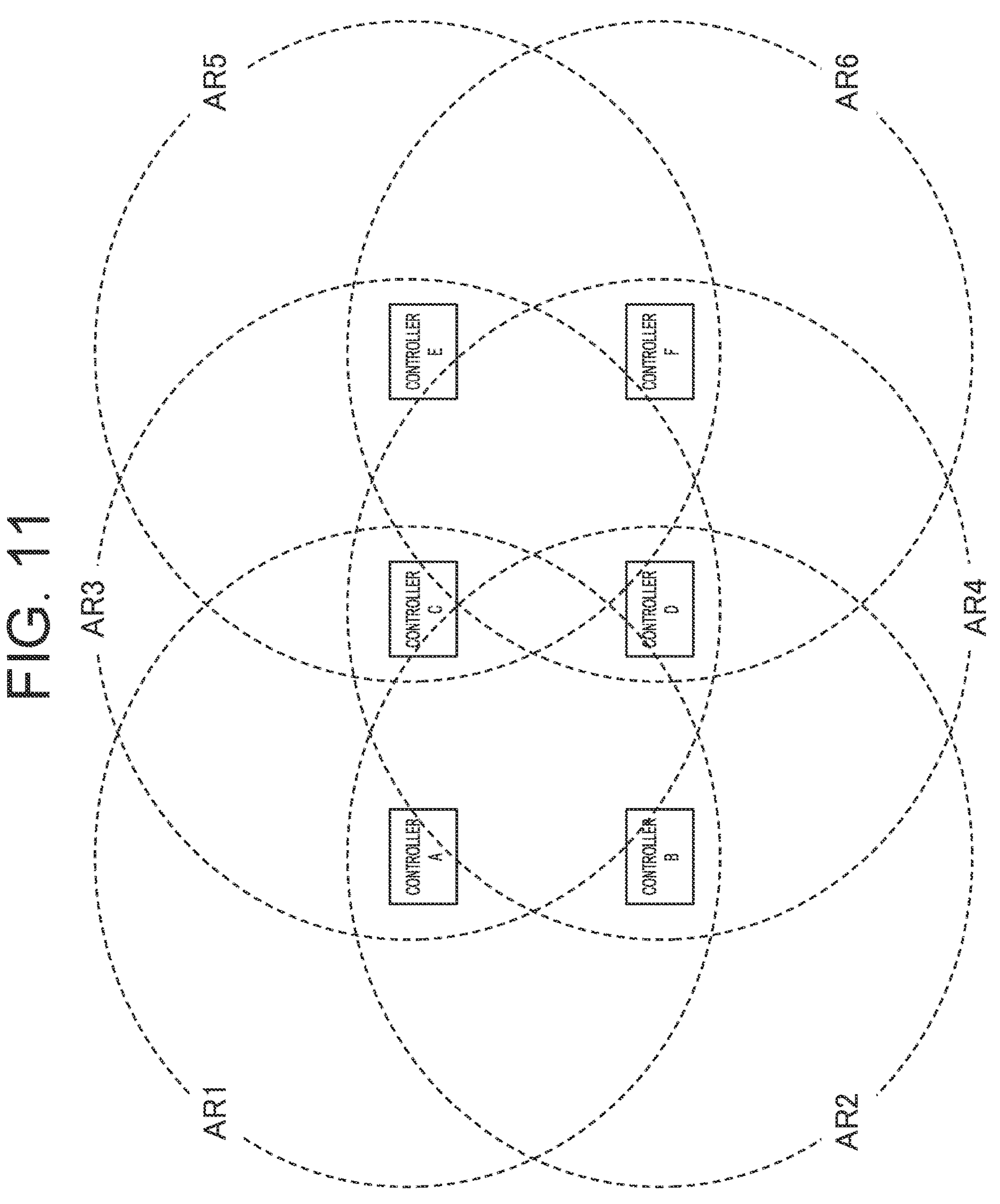
FIG. 11 illustrates a correspondence relationship between controllers and communication areas according to the first embodiment of the present disclosure.

As illustrated in FIG. 6, a plurality of tags Tg are associated with a single controller 2. Each controller 2 can communicate with the plurality of tags Tg, and each tag Tg can communicate with a single controller 2. For example, a controller A can communicate with tags Tg within a communication area AR1, and a controller B can communicate with tags Tg within a communication area AR2. Note that, in reality, a single tag Tg enters the communication areas AR of a plurality of controllers 2 in many cases, as illustrated in FIG. 11, to expect sufficient communication stability. Each tag Tg is associated with the controller 2 which is most stable in communication, among these plurality of controllers 2; as a result, in the areas illustrated in FIG. 11, the radio waves of the plurality of controllers 2 interfere with one another. In the present embodiment, five controllers 2 (i.e., controllers A to E) cover the entire operation area of the facility F1, and can communicate with all the tags Tg in the facility F1. The association information D2 is registered by the later-described processing of the controlling part 11.

The memory 12 may also store picking information, which includes an order in which parts are taken out, for example. The picking information has registered therein, for each part to be picked, information on a tag ID, position information, and picking circumstances. The management server 1 registers information on a picking target in the picking information, on the basis of a picking instruction. Note that the management server 1 may obtain the picking instruction from a server which manages a manufacturing process of a product, or may generate the picking information, based on the manufacturing process stored in the memory 12.

The memory 12 also stores a control program, such as a communication program, for causing the controlling part 11 to execute later-described communication processing (refer to FIG. 10). For example, the communication program is non-temporarily stored in a computer-readable recording medium such as a compact disc (CD) or a digital versatile disc (DVD), and is read by a reader (not illustrated), such as a CD drive or a DVD drive, which is electrically coupled to the management server 1, to be stored in the memory 12.

The controlling part 11 has a controlling device such as a central processing unit (CPU). The CPU is a processor which executes various types of arithmetic processing. The controlling part 11 controls the management server 1 by executing, by means of the CPU, the various types of control programs stored in the memory 12 in advance.

Specifically, the controlling part 11 includes various types of processors, such as an association processor 111, an allocation processor 112, communication processor 113. Note that the controlling part 11 functions as the various types of processors, by executing, by means of the CPU, various types of processing according to the communication program. A part or all of the processors included in the controlling part 11 may be configured by an electric circuit. The communication program may be a program to cause a plurality of processors to function as the various types of processors.

The association processor 111 associates each of the plurality of tags Tg, with one of the plurality of controllers 2.

For example as illustrated in FIG. 5, the association processor 111 associates a plurality of tags Tg having tag IDs “tg0001 to tg0100” provided in a communication area AR1, with a controller A having a controller ID “c0001” provided in the communication area AR1. The association processor 111 associates a plurality of tags Tg having tag IDs "tg0101 to tg0200" provided in a communication area AR2, with a controller B having a controller ID "c0002" provided in the communication area AR2. The association processor 111 associates a plurality of tags Tg having tag IDs "tg0201 to tg0300" provided in a communication area AR3, with a controller C having a controller ID "c0003" provided in the communication area AR3. The association processor 111 associates a plurality of tags Tg having tag IDs "tg0301 to tg0400" provided in a communication area AR4, with a controller D having a controller ID "c0004" provided in the communication area AR4. The association processor 111 associates a plurality of tags Tg having tag IDs "tg0401 to tg0500" provided in a communication area AR5, with a controller E having a controller ID "c0005" provided in the communication area AR5.

Note that the above-described association is performed by associating each tag Tg with the most stable controller 2 for the tag Tg, and thereafter assigning numbers as necessary. In the present disclosure, each of the plurality of slave stations may be associated with one of the plurality of master stations, in advance. A second embodiment deals with a different method (association processing) to associate each of the plurality of slave stations with one of the plurality of master stations.

The association processor 111 registers the information on the controllers 2 and the tags Tg, associated with one another, in the association information D2 (refer to FIG. 5).

Figure 7:
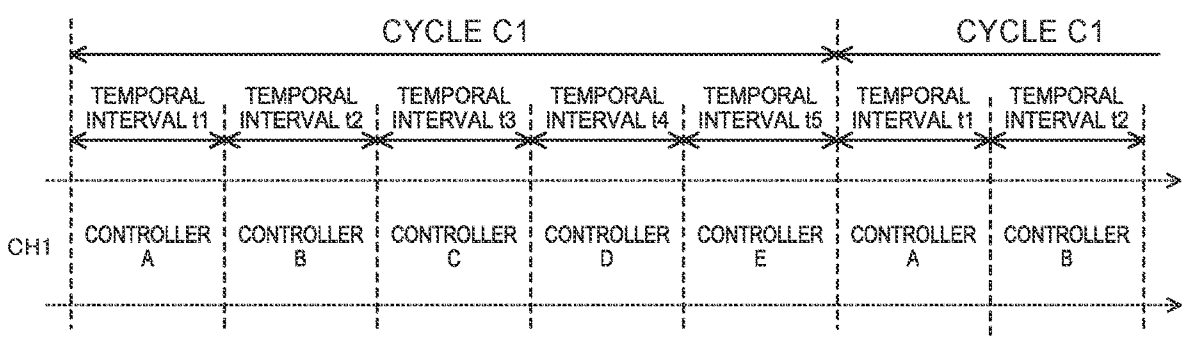
FIG. 7 illustrates an example of temporal intervals allocated to controllers according to an embodiment of the present disclosure.

The allocation processor 112 allocates each of the plurality of controllers 2 to one of the temporal intervals (time slot) resulting from time-dividing a predetermined cycle, in a predetermined channel. For example as illustrated in FIG. 7, when a cycle is "Cl", the cycle Cl is divided into a plurality of temporal intervals. Here, the cycle Cl is assumed to be divided into five temporal intervals t1 to t5. Here, it is also assumed that a predetermined single channel CH1 is used. The number of controllers 2 communicable with the plurality of tags Tg are allocated for the channel CH1 in a predetermined cycle. For example, the allocation processor 112 allocates a controller A to a first temporal interval t1, a controller B to a second temporal interval t2, a controller C to a third temporal interval t3, a controller D to a fourth temporal interval t4, and a controller E to a fifth temporal interval t5.

The allocation processor 112 allocates the controllers A to E to the temporal intervals t1 to t5, in the stated order, in each cycle Cl.

In each of the plurality of temporal intervals, the communication processor 113 causes a controller 2 to communicate with a plurality of tags Tg associated with the controller 2 by the association processor 111, within that temporal interval. The following describes a specific example of the communication method with reference to FIG. 8.

Figure 8:
FIG. 8 illustrates a specific example of a communication method according to an embodiment of the present disclosure.

In an example illustrated in FIG. 8, in the channel CH1, a cycle Cl is assumed to be "200 ms", and a time width for each of temporal intervals t1 to t5 is assumed to be "40 ms". The communication processor 113 outputs, to the controller A, a transmission instruction to transmit transmission data, in the first temporal interval t1 of the cycle Cl. The transmission data is a beacon, for example.

Figure 9:
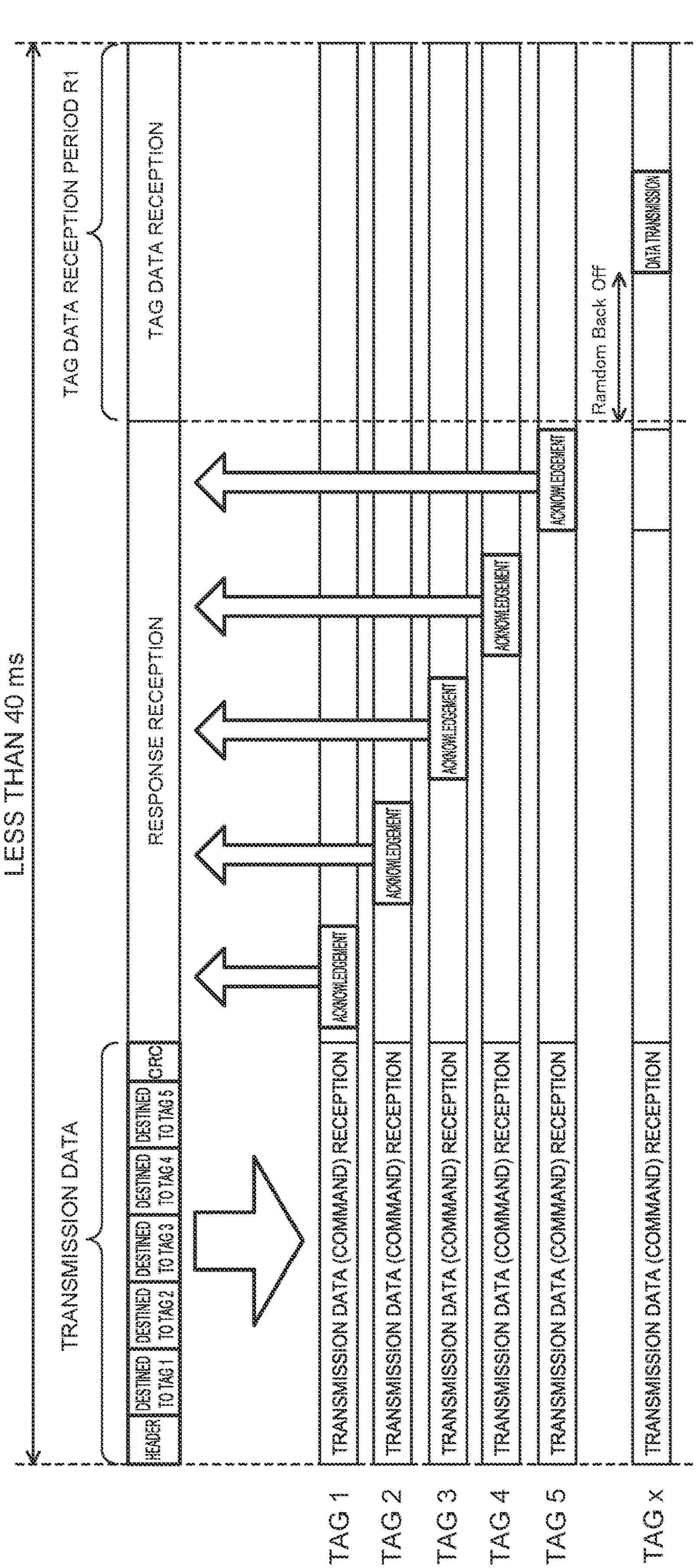
FIG. 9 illustrates a specific example of a communication method according to an embodiment of the present disclosure.

Here, as illustrated in FIG. 9, the transmission data includes information on a command (command information) to cause a tag Tg to execute predetermined processing; and identification information (destination information) to identify the tag Tg to execute the command. Specifically, the transmission data includes destination information of each of a predetermined number of tags Tg; and command information for causing each of the predetermined number of tags Tg to execute a predetermined command. For example, FIG. 9 illustrates an example of transmission data transmitted by the controller A. The communication processor 113 specifies five tags Tg (refer to FIG. 4) associated with the five parts to be picked, from among the plurality of tags Tg (refer to FIG. 5) associated with the controller A, and outputs, to the controller A, a transmission instruction to transmit transmission data, which includes the specified five tags 1 to 5 as the destination.

In other words, the communication processor 113 causes the controller A to transmit transmission data to a predetermined number of tags Tg, from among the plurality of tags Tg associated with the controller A. The controller A transmits the transmission data to the predetermined number of tags Tg communicable with the controller A within the temporal interval.

The controller A, when having obtained the transmission instruction from the management server 1, transmits the transmission data (refer to FIG. 9) to all the tags Tg associated with the controller A (refer to FIG. 5), within the first temporal interval t1 (refer to FIG. 8).

Each tag Tg associated with the controller A, when having received the transmission data, checks the destination included in the transmission data, and executes predetermined processing when a command destined to itself is included. For example, the tag 1, when having received the transmission data including a command destined to itself to light the lamp button B1 (refer to FIG. 3A), lights the lamp button B1 (refer to FIG. 3A), because the command destined to itself is included. In addition, the tag 1, when having executed the command, transmits a response (acknowledgement) to the controller A. Similarly, each of the tags 2 to 5, when having received the transmission data including the same command destined to itself, lights the lamp button B1 (refer to FIG. 3A), because the command destined to itself is included, and transmits a response (acknowledgement) to the controller A. The controller A receives a response from each of the tags 1 to 5 (refer to FIG. 9). Here, the tags 1 to 5 perform transmission at an appropriate timing so as not to interfere with one another, depending on what number a command destined to itself is in the transmission data. In the present embodiment, each tag Tg transmits an acknowledgement of a same size in the order in which the command destined to itself is located in the transmission data, and refrains from transmitting their acknowledgement for a time period including the time required for the other tags Tg to transmit acknowledgement plus a predetermined margin, so that interference of the respective acknowledging signals is prevented.

Also in the present embodiment, a temporal interval is designed to have a tag data reception period R1 (refer to FIG. 9) after the transmission of acknowledgements of all the five tags Tg, and a tag Tg, for which a button function of a lamp is pushed, performs transmission in the Carrier Sense Multiple Access with Collision Avoidance (CSMA/CA) scheme within the subsequent tag data reception period R1. The tag data reception period R1 illustrated in FIG. 9 is an uplink period (from the tag Tg to the controller 2) according to the CSMA/CA scheme.

Note that the acknowledgement is not limited to button push information, and may be how other user interfaces, if any, are operated. In addition, a configuration is possible in which, if a tag Tg has a sensor function, the tag Tg autonomously performs the transmission when the measured value satisfies a predetermined condition.

When the controller A transmits the transmission data to the tags 1 to 5 in the first temporal interval t1 (40 ms) in the cycle Cl (200 ms) and when the command execution of the tags 1 to 5 completes, the communication processor 113 outputs, to the controller B, a transmission instruction to transmit transmission data (refer to FIG. 8), in the next second temporal interval t2 in the cycle Cl (200 ms). The transmission data includes the destinations and commands for the tags 6 to 10.

Each tag Tg associated with the controller B, when having received the transmission data, checks the destination included in the transmission data, and executes predetermined processing when a command destined to itself is included. For example, the tag 6, when having received the transmission data including a command destined to itself to light the lamp button B1 (refer to FIG. 3A), lights the lamp button B1 (refer to FIG. 3A), because the command destined to itself is included. In addition, the tag 6, when having executed the command, transmits a response (acknowledgement) to the controller B. Similarly, each of the tags 7 to 10, when having received the transmission data including the same command destined to itself, lights the lamp button B1 (refer to FIG. 3A), because the command destined to itself is included, and transmits a response (acknowledgement) to the controller B. The controller B receives a response from each of the tags 6 to 10.

When the controller B transmits the transmission data to the tags 6 to 10 in the second temporal interval t2 (40 ms) in the cycle Cl (200 ms) and when the command execution of the tags 6 to 10 completes, the communication processor 113 outputs, to the controller C, a transmission instruction to transmit transmission data, in the next third temporal interval t3 in the cycle Cl (200 ms). The transmission data includes the destinations and commands for the tags 11 to 15 (refer to FIG. 8).

Each tag Tg associated with the controller C, when having received the transmission data, checks the destination included in the transmission data, and executes predetermined processing when a command destined to itself is included. For example, the tag 11, when having received the transmission data including a command destined to itself to light the lamp button B1 (refer to FIG. 3A), lights the lamp button B1 (refer to FIG. 3A), because the command destined to itself is included. In addition, the tag 11, when having executed the command, transmits a response (acknowledgement) to the controller C. Similarly, each of the tags 12 to 15, when having received the transmission data including the same command destined to itself, lights the lamp button B1 (refer to FIG. 3A), because the command destined to itself is included, and transmits a response (acknowledgement) to the controller C. The controller C receives a response from each of the tags 11 to 15 (refer to FIG. 8).

When the controller C transmits the transmission data to the tags 11 to 15 in the third temporal interval t3 (40 ms) in the cycle Cl (200 ms) and when the command execution of the tags 11 to 15 completes, the communication processor 113 outputs, to the controller D, a transmission instruction to transmit transmission data, in the next fourth temporal interval t4 in the cycle Cl (200 ms). The transmission data includes the destinations and commands for the tags 16 to 20.

Each tag Tg associated with the controller D, when having received the transmission data, checks the destination included in the transmission data, and executes predetermined processing when a command destined to itself is included. For example, the tag 16, when having received the transmission data including a command destined to itself to light the lamp button B1 (refer to FIG. 3A), lights the lamp button B1 (refer to FIG. 3A), because the command destined to itself is included. In addition, the tag 16, when having executed the command, transmits a response (acknowledgement) to the controller D. Similarly, each of the tags 17 to 20, when having received the transmission data including the same command destined to itself, lights the lamp button B1 (refer to FIG. 3A), because the command destined to itself is included, and transmits a response (acknowledgement) to the controller D. The controller D receives a response from each of the tags 16 to 20 (refer to FIG. 8).

When the controller D transmits the transmission data to the tags 16 to 20 in the fourth temporal interval t4 (40 ms) in the cycle Cl (200 ms) and when the command execution of the tags 16 to 20 completes, the communication processor 113 outputs, to the controller E, a transmission instruction to transmit transmission data, in the next fifth temporal interval t5 in the cycle Cl (200 ms). The transmission data includes the destinations and commands for the tags 21 to 25.

Each tag Tg associated with the controller E, when having received the transmission data, checks the destination included in the transmission data, and executes predetermined processing when a command destined to itself is included. For example, the tag 21, when having received the transmission data including a command destined to itself to light the lamp button B1 (refer to FIG. 3A), lights the lamp button B1 (refer to FIG. 3A), because the command destined to itself is included. In addition, the tag 21, when having executed the command, transmits a response (acknowledgement) to the controller E. Similarly, each of the tags 22 to 25, when having received the transmission data including the same command destined to itself, lights the lamp button B1 (refer to FIG. 3A), because the command destined to itself is included, and transmits a response (acknowledgement) to the controller E. The controller E receives a response from each of the tags 21 to 25 (refer to FIG. 8).

When the controller E transmits the transmission data to the tags 21 to 25 in the fifth temporal interval t5 (40 ms) in the cycle Cl (200 ms) and when the command execution of the tags 21 to 25 completes, the communication processor 113 outputs, again to the controller A, a transmission instruction to transmit transmission data, in the first temporal interval t1 in the next cycle Cl (200 ms). The transmission data includes the destinations and commands for the tags 1 to 5.

Each tag Tg associated with the controller A, when having received the transmission data, checks the destination included in the transmission data, and executes predetermined processing when a command destined to itself is included. For example, the tag 1, when having received the transmission data including a command destined to itself to light the lamp button B1 (refer to FIG. 3A), lights the lamp button B1 (refer to FIG. 3A), because the command destined to itself is included. In addition, the tag 1, when having executed the command, transmits a response (acknowledgement) to the controller A. Similarly, each of the tags 2 to 5, when having received the transmission data including the same command destined to itself, lights the lamp button B1 (refer to FIG. 3A), because the command destined to itself is included, and transmits a response (acknowledgement) to the controller A. The controller A receives a response from each of the tags 1 to 5 (refer to FIG. 8).

As described above, the communication processor 113, in each of the plurality of temporal intervals, causes a controller 2 and a plurality of tags Tg associated with the controller 2 to communicate with each other, within that temporal interval. In addition, the communication processor 113 outputs, to each of the plurality of controllers 2, the transmission instruction to transmit transmission data, in the order of the temporal intervals. Accordingly, each of the controllers A to E communicates with the tag Tg controlled by each of the controllers A to E, in the order of the temporal intervals t1 to t5.

For example, in the first temporal interval t1, the controller A transmits the transmission data to five tags 1 to 5, among the plurality of tags Tg associated with the controller A; and then in the second temporal interval t2 subsequent to the first temporal interval t1, the controller B transmits the transmission data to five tags 6 to 10, among the plurality of tags Tg associated with the controller B.

In addition, in the first temporal interval t1, the controller A transmits the transmission data to the tags 1 to 5, and the controller A receives a response thereto from the tags 1 to 5. Then in the second temporal interval t2, the controller B transmits the transmission data to the tags 6 to 10.

Here, the controlling part 11 performs processing to synchronize (time synchronization) the management server 1 and each controller. In addition, each controller 2 executes processing to synchronize (time synchronization) with the corresponding tags Tg. As a result, each controller 2 transmits transmission data to a tag Tg in a predetermined cycle (e.g., 200 ms), and each tag Tg receives the transmission data in a predetermined cycle (e.g., 200 ms). For example, each tag Tg starts activation in preparation for a reception time at which the transmission data is received, and starts receiving the transmission data at the reception time. Each tag Tg completes the reception processing by a transmission completion time at which transmission of the transmission data completes in the controller 2, and performs time synchronization after completion of the reception processing. Each tag Tg waits (power saving) by setting a timer until the reception time of the transmission data.

Note that the time synchronization between each controller 2 may be autonomously performed between each controller 2 according to the IEEE 1588 Precision Time Protocol, for example. In addition, the communication processor 113 may notify each controller 2 of the cycle Cl and the temporal intervals t1 to t5, and control each controller 2 to perform communication at the timing illustrated in FIG. 7.

Communication Processing

Figure 10:
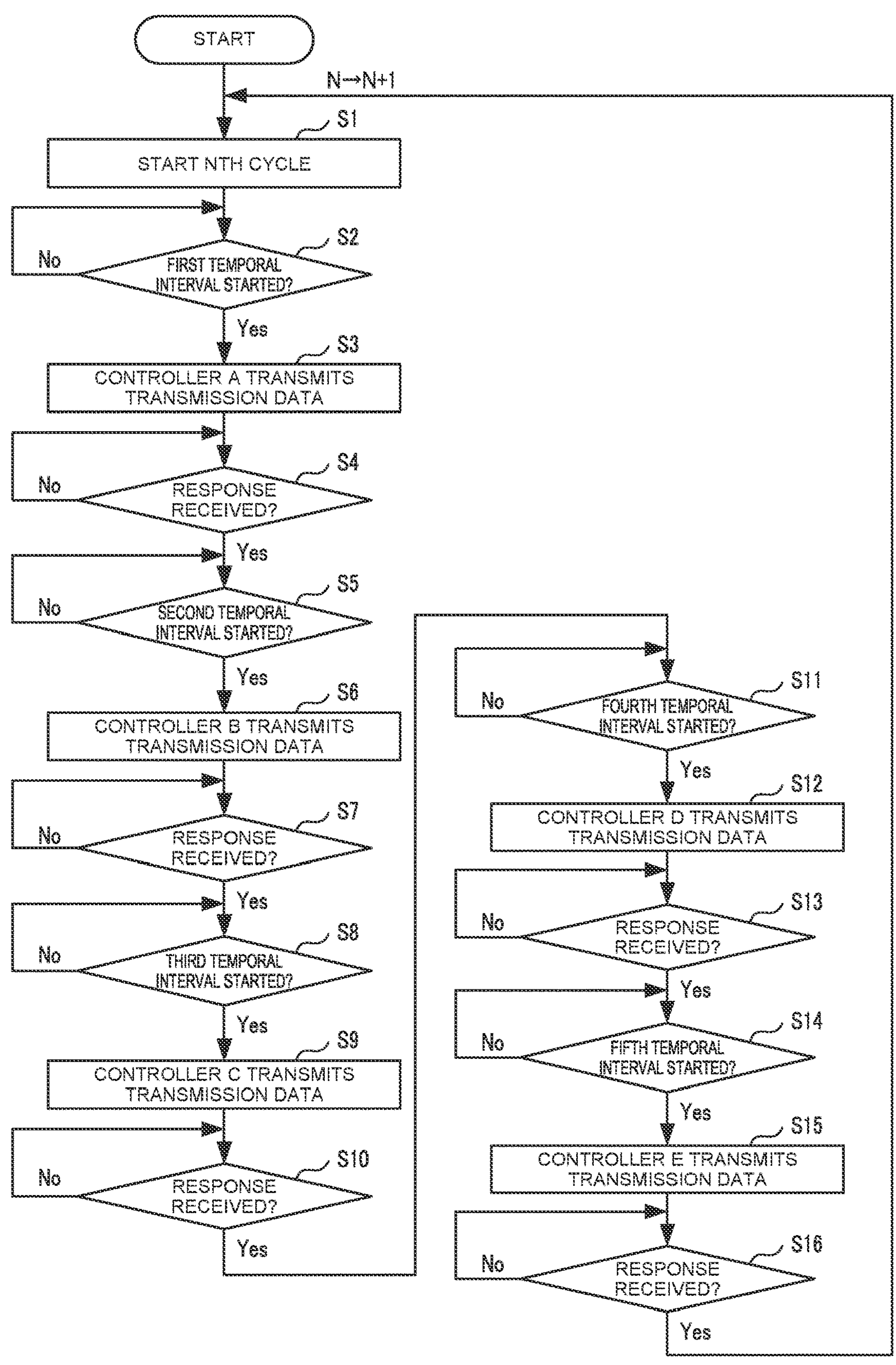
FIG. 10 is a flowchart for explaining an exemplary procedure of communication processing executed in the communication system according to the first embodiment of the present disclosure.

The following describes an exemplary procedure of communication processing executed in the communication system 10 according to the first embodiment, with reference to FIG. 10.

Note that the present disclosure can be interpreted as disclosure of a communication method in which one or a plurality of steps in communication processing are executed, and one or a plurality of the steps included in the communication processing described herein may be omitted as necessary. The order of execution of the steps in the communication processing may differ to the extent that the similar effects are obtainable. Furthermore, the following takes an example in which the steps in the communication processing are executed by the management server 1 and the controller 2. However, the present disclosure can include, as another embodiment, such a communication method in which a plurality of processors execute steps in the communication processing in a distributed manner.

The following takes an example of the communication method described above with reference to FIGS. 8 and 9. The controlling part 11 of the management server 1 uses a predetermined channel CH1 to output a transmission instruction of transmission data (refer to FIG. 8) to each of the controllers A to E having been allocated to five temporal intervals t1 to t5 (40 ms each), where the five temporal intervals t1 to t5 result from time-division of the predetermined cycle (200 ms).

First, when a first cycle (N=1) starts (S1), in step S2, the controlling part 11 determines whether the first temporal interval t1 has started. When the first temporal interval t1 has started (S2: Yes), in step S3, the controlling part 11 outputs, to the controller A, a transmission instruction to transmit transmission data. The controller A, having obtained the transmission instruction, transmits the transmission data including tags Tg to execute the command (e.g., tags 1 to 5) as a destination, to all the tags Tg associated with the controller A (refer to FIG. 5).

Next, in step S4, the controlling part 11 determines whether responses (acknowledgement) of the tags Tg have been received. For example, when the tags 1 to 5 receive the transmission data, execute a command (lighting command) and transmit a response to the controller A, the controller A transmits the received responses to the management server 1. As a result, the controlling part 11 of the management server 1 receives the responses. When the controlling part 11 receives the responses (S4: Yes), the processing proceeds to step S5.

In step S5, the controlling part 11 determines whether the second temporal interval t2 has started. When the second temporal interval t2 has started (S5: Yes), in step S6, the controlling part 11 outputs, to the controller B, a transmission instruction to transmit transmission data. The controller B, having obtained the transmission instruction, transmits the transmission data including tags Tg to execute the command (e.g., tags 6 to 10) as a destination, to all the tags Tg associated with the controller B (refer to FIG. 5).

Next, in step S7, the controlling part 11 determines whether responses of the tags Tg have been received. For example, when the tags 6 to 10 receive the transmission data, execute a command (lighting command) and transmit a response to the controller B, the controller B transmits the received responses to the management server 1. As a result, the controlling part 11 of the management server 1 receives the responses. When the controlling part 11 receives the responses (S7: Yes), the processing proceeds to step S8.

In step S8, the controlling part 11 determines whether the third temporal interval t3 has started. When the third temporal interval t3 has started (S8: Yes), in step S9, the controlling part 11 outputs, to the controller C, a transmission instruction to transmit transmission data. The controller C, having obtained the transmission instruction, transmits the transmission data including tags Tg to execute the command (e.g., tags 11 to 15) as a destination, to all the tags Tg associated with the controller C (refer to FIG. 5).

Next, in step S10, the controlling part 11 determines whether responses of the tags Tg have been received. For example, when the tags 11 to 15 receive the transmission data execute a command (lighting command) and transmit a response to the controller C, the controller C transmits the received responses to the management server 1. As a result, the controlling part 11 of the management server 1 receives the responses. When the controlling part 11 receives the responses (S10: Yes), the processing proceeds to step S11.

In step S11, the controlling part 11 determines whether the fourth temporal interval t4 has started. When the fourth temporal interval t4 has started (S11: Yes), in step S12, the controlling part 11 outputs, to the controller D, a transmission instruction to transmit transmission data. The controller D, having obtained the transmission instruction, transmits the transmission data including tags Tg to execute the command (e.g., tags 16 to 20) as a destination, to all the tags Tg associated with the controller D (refer to FIG. 5).

Next, in step S13, the controlling part 11 determines whether responses of the tags Tg have been received. For example, when the tags 16 to 20 receive the transmission data, execute a command (lighting command) and transmit a response to the controller D, the controller D transmits the received responses to the management server 1. As a result, the controlling part 11 of the management server 1 receives the responses. When the controlling part 11 receives the responses (S13: Yes), the processing proceeds to step S14.

In step S14, the controlling part 11 determines whether the fifth temporal interval t5 has started. When the fifth temporal interval t5 has started (S14: Yes), in step S15, the controlling part 11 outputs, to the controller E, a transmission instruction to transmit transmission data. The controller E, having obtained the transmission instruction, transmits the transmission data including tags Tg to execute the command (e.g., tags 21 to 25) as a destination, to all the tags Tg associated with the controller E (refer to FIG. 5).

Next, in step S16, the controlling part 11 determines whether responses of the tags Tg have been received. For example, when the tags 21 to 25 receive the transmission data, execute a command (lighting command) and transmit a response to the controller E, the controller E transmits the received responses to the management server 1. As a result, the controlling part 11 of the management server 1 receives the responses. When the controlling part 11 receives the responses (S16: Yes), the processing returns to step S1.

When the processing has returned to step S1, a second cycle (N=2) starts, and in step S2, the controlling part 11 determines whether the first temporal interval t1 has started. When the first temporal interval t1 has started (S2: Yes), in step S3, the controlling part 11 outputs, to the controller A, a transmission instruction to transmit transmission data. The controller A, having obtained the transmission instruction, transmits the transmission data including tags Tg to execute the command (e.g., tags 1 to 5) as a destination, to all the tags Tg associated with the controller A (refer to FIG. 5). The processing hereafter is similar to those described above. In this way, the communication system 10 executes the communication processing.

As described so far, the communication system 10 according to the first embodiment is a communication system in which a plurality of controllers 2 (master station) wirelessly communicate with a plurality of tags Tg (slave station) in a predetermined cycle. The communication system 10 associates each of the plurality of tags Tg with one of the plurality of controllers 2. The communication system 10 also associates each of the plurality of controllers 2 with one of a plurality of temporal intervals (time slot) intervals (time slot) resulting from time-dividing the predetermined cycle in a predetermined channel. In each of the plurality of temporal intervals, the communication system 10 causes a controller 2 to communicate with the plurality of tags Tg associated with the controller 2, within that temporal interval.

In the above-described configuration, each controller 2 uses radio waves only in the temporal interval (40 ms) out of the cycle (e.g., 200 ms). In addition, by allocating (adjusting) the time during which the controllers 2 are allowed to use the radio waves, to avoid overlapping thereamong, the plurality of controllers 2, up to the maximum of five controllers, can share a single channel (CH1). As a result, even in the case of FIG. 11 where the communication areas AR overlap with one another, a multitude of controllers 2 can be provided. For example, if the number of frequency channels is 20 in an area where radio waves interfere with one another, a hundred controllers 2 can be provided, which is five times the number of channels.

Depending on the factory layouts or the types of lines, there are cases in which channels are desirably allocated to the controllers 2, in consideration of the maximum number of channels that can be shared between the controllers 2. In such a case, such a display screen (UI) may be provided, in which the numbers for the controllers (e.g., 1 to 64) can be set and mapped on a table having the vertical line representing a time slot (slot number) and the horizontal line representing a channel (frequency channel) as illustrated in FIG. 12. In other words, the controlling part 11 may display, to be visually identifiable, predetermine channels and predetermined temporal intervals, to which a plurality of controllers 2 (master station) are allocated.

In addition, the transmission data includes destination information of a plurality of tags Tg. According to this configuration, each of a plurality of controllers 2 can use a single channel to communicate with a plurality of tags Tg, in each temporal interval allocated to the plurality of controllers 2, in each cycle. Therefore, a multitude of tags Tg can be provided in a wide range. In addition, a communication amount increases in the communication system 10. As a result, a multitude of tags Tg can be provided by ensuring high-speed responsiveness in communication of the controllers 2 and the tags Tg.

In the communication system 10 according to the present embodiment, a plurality of controllers 2 (master station) mutually synchronize time, and perform communication within the temporal interval allocated by the allocation processor 112. The plurality of controllers 2 may be coupled with one another by wired communication.

When data in the tag Tg (slave station) is to be transmitted, the communication processor 113 causes the data to be transmitted to a controller 2 associated with the tag Tg, within the temporal interval allocated to the controller 2.

The data in the tag Tg to be transmitted is data observed in the tag Tg. In addition, the data observed in the tag Tg is data corresponding to how the user interface of the tag Tg is operated.

The present disclosure is not limited to the above-described embodiment, and may be embodiments as described follows. In an example, the communication system 10 may include a plurality of channels. In such a case, the allocation processor 112 allocates the plurality of controllers 2 respectively to the plurality of temporal intervals in each channel. As a result, five controllers A to E share a channel CH1, five controllers F to J share a channel CH2, five controllers K to O share a channel CH3, five controllers P to T share a channel CH4, and five controllers U to Y share a channel CH5. As in the above-described embodiment, each controller 2 communicates with a plurality of tags Tg in each of the plurality of temporal intervals resulting from time-dividing a predetermined cycle. According to this configuration, the providable number of controllers 2 can be increased depending on the number of available channels. As a result, even more tags Tg can be provided.

In the above-described embodiment, a cycle of 200 ms is divided into five slots of 40 ms. However, this is merely an example; and the cycle, the number of division, and the slot time may be set as appropriate, by taking into consideration the time responsiveness, the power consumption, the number of slave stations, the number of available frequency channels, the communication speed, etc. which are required for each intended use.

Also in the above-described embodiment, the management server 1 (mediating station) controls a plurality of controllers 2. However, in another embodiment, a specific controller 2, from among the controllers 2, may also function as the management server 1. In such a case, the specific controller 2 functions as a master controller, and the other controllers 2 function as slave controllers. The master controller executes allocation processing to allocate each of the plurality of slave controllers to one of the plurality of temporal intervals in a predetermined channel, and communication processing to cause each of the slave controllers to communicate with the plurality of tags Tg in each of the plurality of temporal intervals. The master controller transmits the transmission data to each slave controller in the order of the temporal intervals. Note that the controller 2 to function as the master controller may be interchanged, as necessary, depending on the communication state in the entire communication system 10.

Second Embodiment

The communication system 10 according to a second embodiment of the present disclosure is described. In the following, the same configuration and processing as those for the communication system 10 according to the first embodiment is assigned the same reference numeral, and the description thereof is omitted.

In a case where a multitude of star topology networks are constructed, which are made of controllers 2 and a plurality of tags Tg, the communication system 10 according to the second embodiment is a system in which each of the plurality of tags Tg is associated with a specific controller 2 in which communication is stable, with a simple configuration. Each tag Tg is associated with any one of the controllers 2. Note that "association" to associate a tag Tg and a controller 2 is also referred to as "linking (Himozuke)" and "binding".

Figure 13:
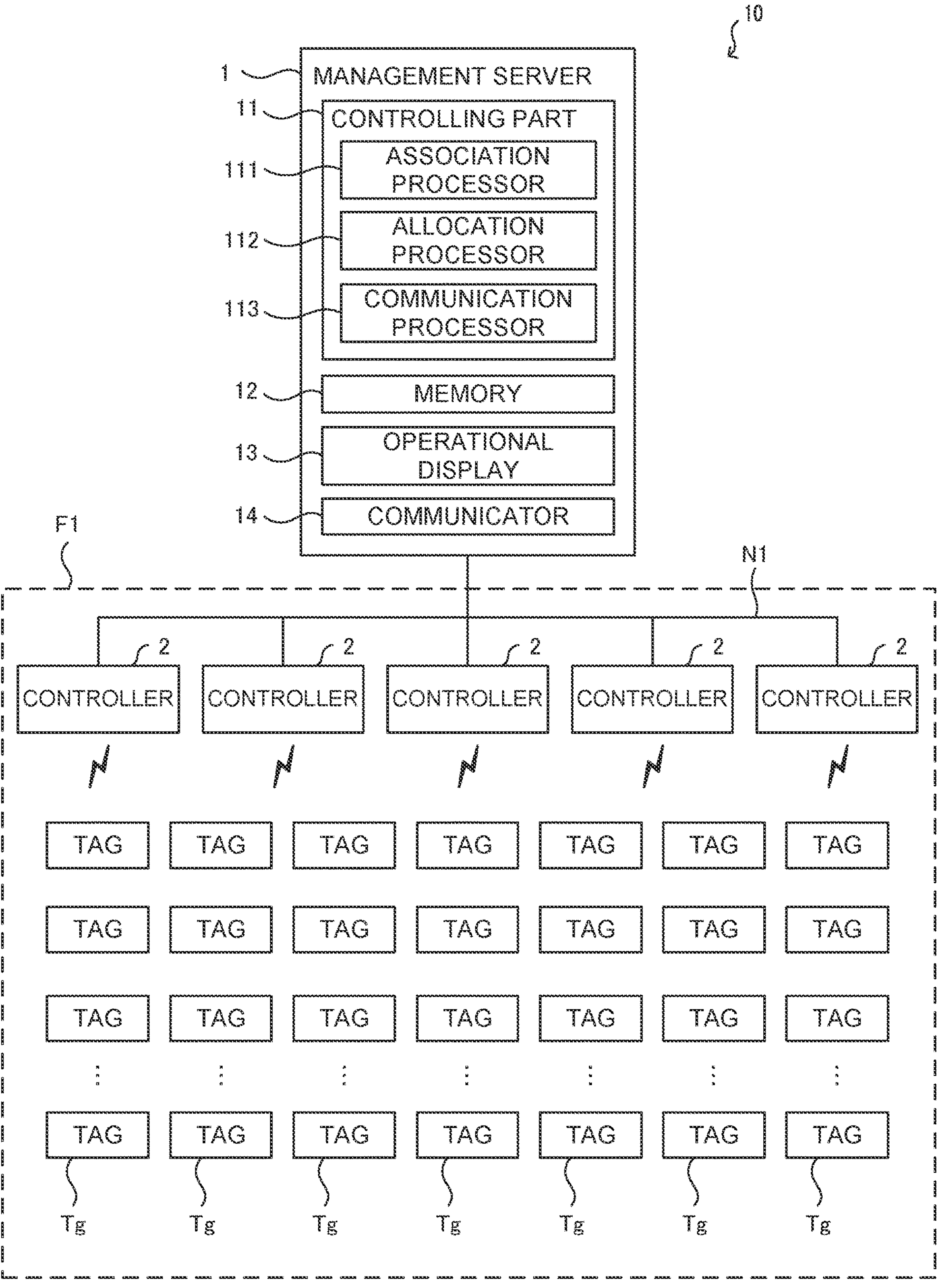
FIG. 13 is a functional block diagram illustrating an overall configuration of a communication system according to a second embodiment of the present disclosure.

FIG. 13 is a functional block diagram illustrating an overall configuration of a communication system 10 according to the second embodiment of the present disclosure. In the configuration illustrated in FIG. 13, each of the plurality of tags Tg is in the state before being associated with any controller 2. Note that in the configuration illustrated in FIG. 1, each of the plurality of tags Tg is in the state after being associated with any controller 2.

The communication system 10 includes a management server 1, a plurality of controllers 2, and a plurality of tags Tg. Note that one or a plurality of the controllers 2 may have a function of the management server 1. In other words, the management server 1 may be a controller 2.

For example, a tag Tg1 (an example of the first slave station of the present disclosure), among the plurality of tags Tg, transmits a search signal including identification information (tag ID) of the tag Tg1, so as to identify a controller 2 (an example of the first master station of the present disclosure) corresponding to the tag Tg1. Each of the plurality of controllers 2, when having received the search signal transmitted from the tag Tg1, transmits, to the management server 1, an analysis report including its own identification information (controller ID), the identification information (tag ID) of the tag Tg1, and signal information related to the search signal (e.g., receiving strength of the search signal). Based on a plurality of analysis reports received from the plurality of controllers 2, the management server 1 determines the controller 2 (e.g., controller A) corresponding to the tag Tg1, from among the plurality of controllers 2, and associates the tag Tg1 and the controller A with each other. The communication system 10 executes the above-described processing for each tag Tg, and associates each tag Tg with any one of the controllers 2.

The following describes a specific configuration of the communication system 10 according to the second embodiment. In the second embodiment, a cycle of 200 ms is divided into 16 slots, each slot having 12.5 ms. In other words, one frequency channel can be shared by maximum of 16 controllers.

Figure 14:
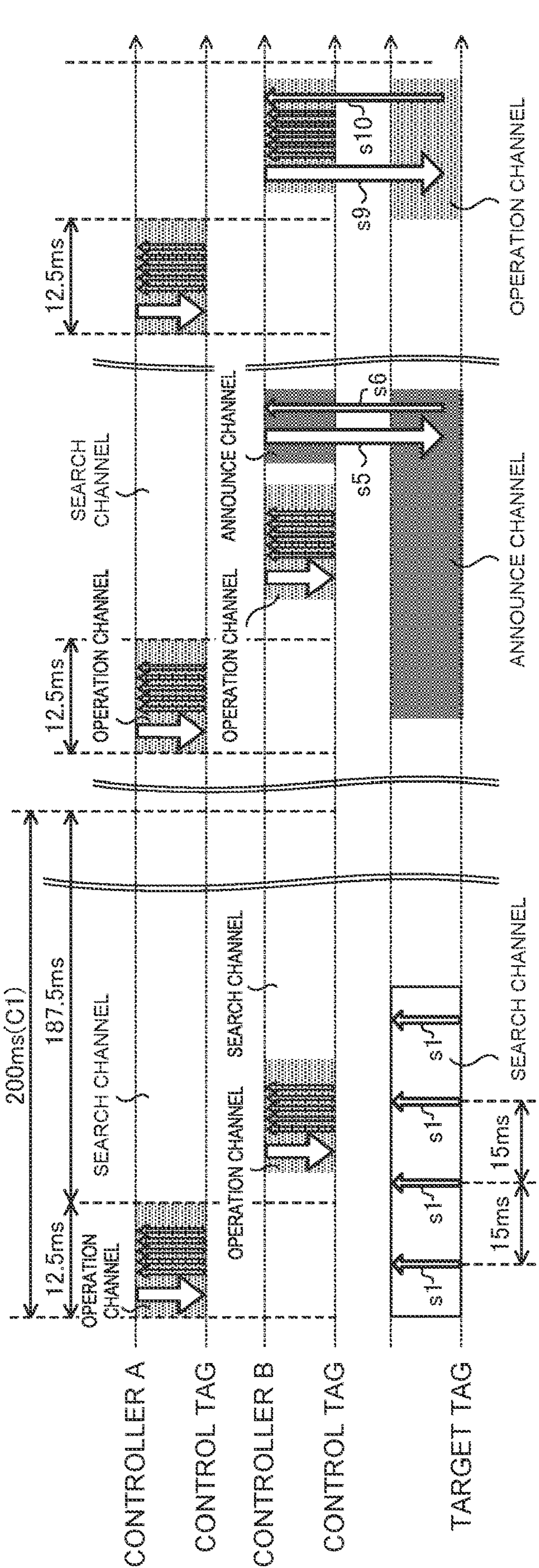
FIG. 14 illustrates a specific example of association processing in the communication system according to the second embodiment of the present disclosure.
Figure 15:
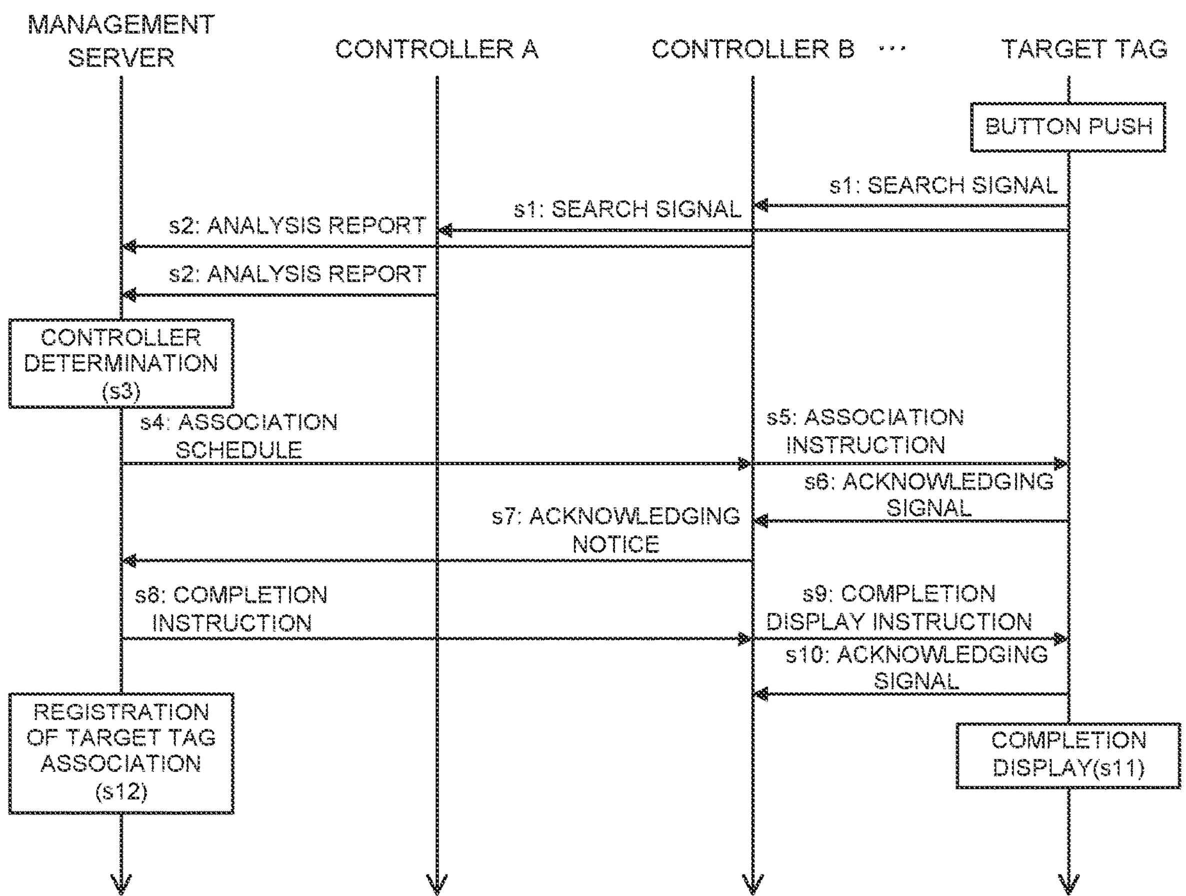
FIG. 15 illustrates an exemplary procedure of association processing to associate a management server, a plurality of controllers, and a target tag, in the communication system according to the second embodiment of the present disclosure.

FIG. 14 illustrates a specific example of association processing of a tag Tg (target tag Tg) associated with any of the controller 2. FIG. 15 illustrates an exemplary procedure of association processing to associate a management server 1, a plurality of controllers 2, and a target tag Tg, according to the second embodiment of the present disclosure. FIG. 14 also includes step numbers (s1, s5, s6, s9, s10) corresponding to the processing steps in FIG. 15.

In FIG. 14, in an operation channel to which a slot of "12.5 ms" is set, the controller A transmits transmission data (command) to a predetermined number of tags Tg (maximum of five), among the plurality of tags already associated with the controller A, for example. The controller A switches "187.5 ms", which is obtained by subtracting "12.5 ms" from "200 ms", to a search channel. The controller A is prepared to receive a search signal transmitted from the target tag Tg in the search channel (reception wait state). The controller B and the other controllers have the same configuration as that of the controller A.

Figure 3B:
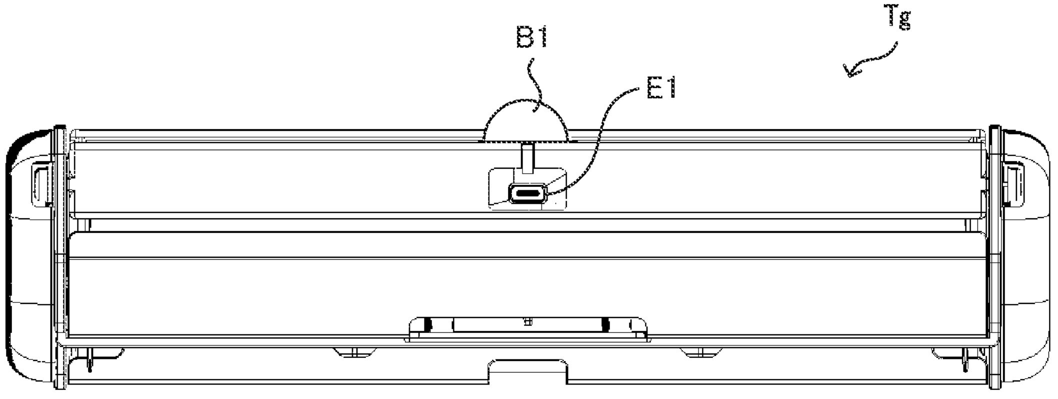
FIG. 3B is a bottom view of a tag according to an embodiment of the present disclosure.

In the association processing, the target tag Tg first transmits a search signal (step s1 in FIG. 15). Specifically, the target tag Tg transmits a search signal when having accepted a predetermined user operation. For example, when a user pushes a bottom button E1 of the target tag Tg (refer to FIG. 3B), the target tag Tg accepts the pushing operation of the user and transmits a search signal. The target tag Tg transmits the search signal in a search channel. In addition, the target tag Tg transmits a search signal a plurality of times in a time interval (e.g., interval of "15 ms") which is longer than a slot time (here, "12.5 ms") in the time-division communication allocated to each controller 2. Here, the target tag Tg transmits the search signal four times in the interval of "15 ms" in the search channel. In this way, the controller 2 performs time-division communication with the tag Tg, and the tag Tg transmits the search signal a plurality of times in a time interval which is longer than the slot time used in the time-division communication. By making the transmission interval of the search signal longer than the slot time, all the controllers 2 can receive the search signal at least a plurality of times.

Each of the plurality of controllers 2 receives the search signal transmitted from the target tag Tg, in the reception wait state of the search channel. For example, among all the controllers 2 provided in the facility F1, the plurality of controllers 2 provided in the range in which the signal from the target tag Tg can reach receive the search signal.

Each of the plurality of controller 2, when having received the search signal, transmits, to the management server 1, an analysis report including identification information (controller ID) of the controller 2, the identification information (tag ID) of the tag Tg, and signal information related to the search signal (e.g., receiving strength) (step s2 in FIG. 15). The analysis report also includes the time of day at which the search signal is received, and the search signal number (i.e., if transmission is performed four times, information indicating in what number in the four times of transmission, the search signal is transmitted). Based thereon, the management server 1 can obtain a reception start time at which the tag Tg starts reception in an announce channel. Note that since the target tag Tg is desirably associated with the controller 2 in which communication is sufficiently stable, the controller 2 may have such a configuration as not to transmit any analysis report which corresponds to a search signal of a receiving strength that is a predetermined value or less.

The management server 1, when having received the analysis report from each controller 2, determines the controller 2 to be associated with the target tag Tg (step s3 in FIG. 15). Specifically, the association processor 111 of the management server 1 determines the controller 2 to be associated with the target tag Tg, based on the stability of the search signal. For example, the association processor 111 summarizes the analysis report corresponding to the target tag Tg, and determines the controller 2 whose search signal is the most stable, when for example three or more search signals, out of all the first to the last (here, the fourth) search signals, have been received. The association processor 111 calculates the stability of the search signal, based on the average value of the signal strength of the search signal. Alternatively, the association processor 111 may calculate the stability of the search signal, based on the average value or the lowest strength of the signal strength of the search signal, the signal strength variation of the search signal, or the like.

Once the controller 2 is determined, the association processor 111 transmits, to the controller 2, an association schedule (binding schedule) to associate the target tag Tg (step s4 in FIG. 15). Here, the association processor 111 determines the controller B to be the controller 2 to be associated with the target tag Tg, and transmits the association schedule to the controller B. The association schedule includes at least the address of the controller B, the reception start time (which is one second after the time at which the last search signal is transmitted) at which the target tag Tg starts reception in the announce channel. Note that the transmission processing to transmit the association schedule is desirably performed within a predetermined time period which is immediately after the slot time, so as to reduce the possibility of multiple collisions with the search signal transmitted at the interval of 15 ms.

The controller B, having received the association schedule from the management server 1, transmits the association instruction (binding instruction) to the target tag Tg in the announce channel, at the reception start time included in the association schedule (step s5 in FIG. 15). The association instruction at least includes the address of the target tag and the address of the controller B to be associated, and further includes information on the operation channel which is allocated to the controller B if there are a plurality of operation channels.

At the reception start time, the target tag Tg receives the association instruction in the announce channel. The target tag Tg, when having received the association instruction destined to its own address, switches to the designated operation channel, and receives a beacon output by the controller B (which may include a command to instruct lighting), on a regular basis. After switching to the operation channel and when having received the command destined to itself, the target tag Tg executes the command and returns an acknowledging signal (acknowledge) to the controller B (step s6 in FIG. 15).

The controller B, when having received the acknowledging signal from the target tag Tg, transmits an acknowledging notice to the management server 1 (step s7 in FIG. 15). The management server 1, when having received the acknowledging notice from the controller B, returns a completion instruction to the controller B (step s8 in FIG. 15). The controller B, when having received the completion instruction from the management server 1, transmits a completion display instruction to the target tag Tg (step s9 in FIG. 15).

The target tag Tg, when having received the completion display instruction from the controller B, returns an acknowledging signal (acknowledgement) to the controller B (step s10 in FIG. 15) and performs a completion display (step s11 in FIG. 15). For example, the target tag Tg lights the lamp button B1 (refer to FIG. 3A).

Finally, the management server 1 registers information to associate the target tag Tg and the controller B, as the association information D2 (refer to FIG. 5) (step s12 in FIG. 15). Note that the management server 1 may alternatively register such information at the time when the management server 1 receives the acknowledging notice as described above (step s7 in FIG. 15).

The communication system 10 executes the above-described processing for each tag Tg, and associates each tag Tg to one controller 2. In this way, the management server 1 notifies the target tag Tg of at least an identifier or a communication channel of the controller B, and the target tag Tg communicates with the controller B, based at least on the identifier or the communication channel of the controller B. In the communication system 10, the channel in which the target tag Tg transmits the search signal is different from the channel in which the target tag Tg communicates with the controller B after being associated with the controller B.

Association Processing

Figure 16:
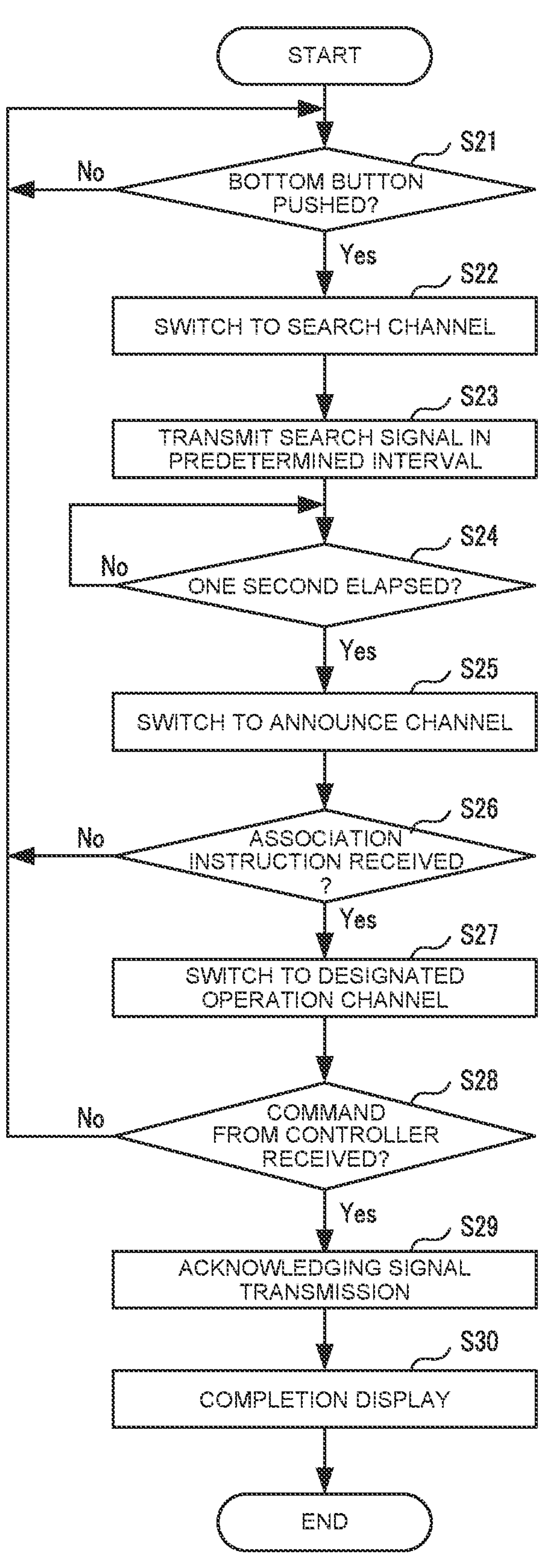
FIG. 16 is a flowchart for explaining an exemplary procedure of association processing executed in a target tag according to the second embodiment of the present disclosure.
Figure 17:
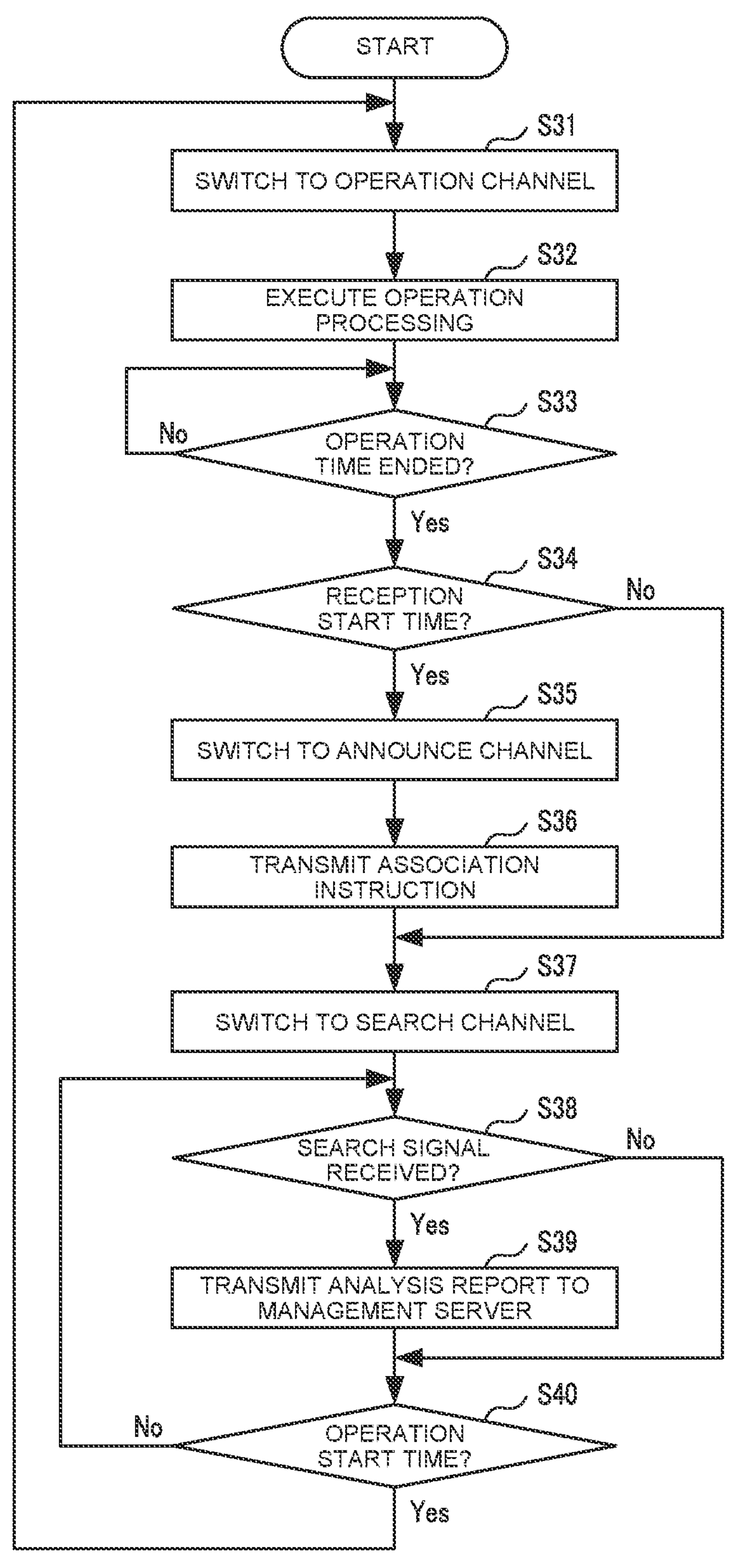
FIG. 17 is a flowchart for explaining an exemplary procedure of association processing executed in a controller according to the second embodiment of the present disclosure.
Figure 18:
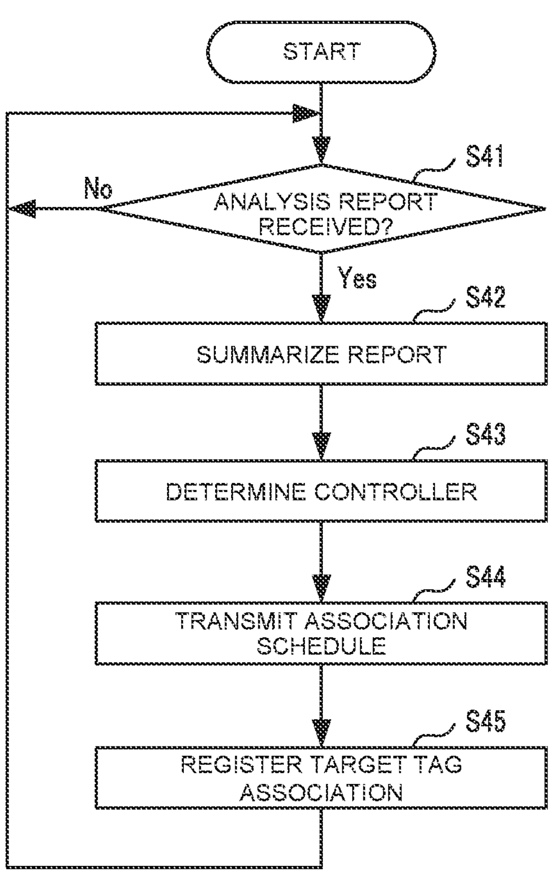
FIG. 18 a flowchart for explaining an exemplary procedure of association processing executed in a management server according to the second embodiment of the present disclosure.

The following describes an exemplary procedure of association processing executed in the communication system 10 according to the second embodiment of the present disclosure, with reference to FIGS. 16 to 18. FIG. 16 illustrates an exemplary procedure of association processing executed in the target tag Tg, FIG. 17 illustrates an exemplary procedure of association processing executed in the controller 2, and FIG. 18 illustrates an exemplary procedure of association processing executed in the management server 1.

Association Processing in the Target Tag Tg

The target tag Tg is almost in a hibernation state at first; and determines, in step S21 in FIG. 16, whether the bottom button E1 has been pushed. When the bottom button E1 has been pushed (S21: Yes), the target tag Tg is brought into an operation state, and causes the processing to proceed to step S22. The target tag Tg waits in the hibernation state, until the bottom button E1 is pushed (S21: No).

In step S22, the target tag Tg switches to a search channel. In the subsequent step S23, the target tag Tg transmits the search signal a plurality of times in a predetermined interval (step s1 in FIG. 15). For example, the target tag Tg transmits the search signal in the search channel four times in the interval of "15 ms". After transmitting the last (fourth) search signal, the target tag Tg waits until a predetermined time (one second) elapses (S24).

Subsequently, in step S25, the target tag Tg switches to an announce channel from the search channel. In step S26, the target tag Tg tries to receive the association instruction from the controller 2 (controller B determined in the management server 1) for 500 ms. The target tag Tg, when having received the association instruction (S26: Yes) (step s5 in FIG. 15), causes the processing to proceed to step S27. On the other hand, the target tag Tg, when not receiving the association instruction within the above-described 500 ms (S26: No), causes the processing to proceed to step S21.

In step S27, the target tag Tg switches from the announce channel to the operation channel designated by the association instruction, and receives the beacon from the controller B in synchronization, based on the address of the controller B obtained from the association instruction.

Subsequently in step S28, the target tag Tg determines whether a command destined to itself has been received from the controller B. The target tag Tg, when having received the command destined to itself from the controller B (S29: Yes), causes the processing to proceed to step S30. On the other hand, the target tag Tg, when not receiving the command destined to itself from the controller B (S29: No), causes the processing to proceed to step S21.

Subsequently in step S30, the target tag Tg transmits the acknowledging signal to the controller B (step s6 in FIG. 15). Thereafter, when having received the completion display instruction from the controller B, the target tag Tg returns the acknowledging signal to the controller B, and lights the lamp button B1 (refer to FIG. 3A) (S30) (steps s9 and s10 in FIG. 15).

Association Processing in the Controller 2

In step S31 illustrated in FIG. 17, the controller 2 (controller B in this example) sets the operation channel allocated to itself. Subsequently in step S32, the controller B executes the operation processing instructed by the management server 1. For example, the controller B transmits transmission data (command) to a predetermined number of tags Tg, among the plurality of tags Tg already associated.

Subsequently, when a predetermined operation time (slot time "12.5 ms") has been ended (S33: Yes), the controller B causes the processing to proceed to step S34.

In step S34, the controller B determines whether the reception start time has come at which the target tag Tg starts reception in the announce channel (which is one second after the time at which the target tag Tg transmitted the last search signal). At the reception start time (S34: Yes), the controller B switches from the operation channel to the announce channel (S35), and transmits the association instruction to the target tag Tg (S36) (step s5 in FIG. 15). When the reception start time has not come (S34: No), the controller B cause the processing to step S37.

In step S37, the controller B switches from the announce channel to the search channel. Subsequently in step S38, the controller B determines whether the search signal has been received from the target tag Tg. The controller B, when having received the search signal (S38: Yes), causes the processing to proceed to step S39. The controller B, when not receiving the search signal (S38: No), causes the processing to proceed to step S40.

In step S39, the controller B transmits the analysis report to the management server 1 (step s2 in FIG. 15). For example, the controller B transmits the analysis reports for the four times to the management server 1.

Subsequently in step S40, the controller B determines whether the operation start time has come. When the operation start time has come (S40: Yes), the controller B returns to step S31, and switches to the operation channel. The controller B repeats the processing in steps S38 and S39 until the operation start time (S40: No). Each controller 2 repeatedly executes the above-described processing.

Association Processing in the Management Server 1

In step S41 illustrated in FIG. 18, the management server 1 determines whether analysis reports have been received from the plurality of controllers 2. For example, the management server 1 receives a plurality of analysis reports (for three to four search signals) from the controller B.

When having received a plurality of analysis reports from a plurality of controllers 2 (S41: Yes), the management server 1 summarizes the plurality of analysis reports (S42), and determines the controller 2 to be associated with the target tag Tg (S43) (step s3 in FIG. 15). For example, the management server 1 obtains the lowest receiving strength of the plurality of search signals for each controller 2, and determines the controller 2 whose lowest receiving strength is the highest. Then, the management server 1 determines the controller 2 whose lowest receiving strength is the highest, to be the controller 2 to be associated with the target tag Tg.

When having determined one controller 2 (here, the controller B) (S43), the management server 1 transmits, to the controller B, the association schedule (binding schedule) to associate the target tag Tg, in step S44 (step s4 in FIG. 15).

The controller B, when having received the association schedule, transmits the association instruction (binding instruction) to the target tag Tg, and is associated with the target tag Tg. Note that this processing corresponds to the communication processing in step S36 in FIG. 17.

The management server 1, after completing confirmation of the association between the target tag Tg and the controller B, registers information to associate the target tag Tg and the controller B, as the association information D2 (refer to FIG. 5) (S45) (step s12 in FIG. 15). The management server 1 repeatedly executes the above-described processing each time the analysis report is received from the controller 2.

As described above, the communication system 10 according to the second embodiment is a communication system that includes the management server 1, a plurality of controllers 2 (master station), and a plurality of tags Tg (slave station). In addition, the first tag Tg transmits a search signal identifying the first controller 2 corresponding to the first tag Tg. Each of the plurality of controllers 2, when having received the search signal, transmits, to the management server 1, an analysis report including identification information of the controller 2, the identification information of the first tag Tg, and the signal information related to the search signal. Based on the plurality of analysis reports respectively received from the plurality of controllers 2, the management server 1 determines the first controller 2 corresponding to the first tag Tg, from among the plurality of controllers 2, and associates the first tag Tg with the first controller 2.

According to the above-described configuration, by summarizing the analysis reports sent from the controller 2, which have received the search signal transmitted from the tag Tg triggered by a predetermined event (e.g., user operation), a multitude of tags Tg can be associated by a simple operation such as pushing of a button of a tag Tg. In other words, the controllers 2 and the plurality of tags Tg can be associated with one another with a simple configuration. In addition, a tag Tg has only to receive an association instruction within a predetermined time after transmitting a search signal a plurality of times, and as a result, the communication load and the battery consumption of the tag Tg can be restrained. Furthermore, it becomes possible to further reduce the battery consumption by entering the sleep (pause) mode unless during communication.

In another embodiment of the present disclosure, the tag Tg may transmit the search signal when having received a predetermined signal. For example, the tag Tg transmits a search signal when a transmission instruction to transmit the search signal is received from the management server 1.

Alternatively, the tag Tg may transmit the search signal after elapse of a predetermined time. For example, the tag Tg transmits the search signal when a pre-set time has elapsed. Accordingly, the tag Tg executes the association processing on a regular basis, to be associated with the most suitable controller 2.

Still alternatively, the tag Tg may transmit the search signal when the communication has become unstable. For example, the tag Tg transmits the search signal in such cases where the reception status of the beacon has deteriorated, i.e., where the received signal level falls below a predetermined state, or where a failure of beacon reception is a predetermined condition. As a result, even when the situation has changed due to relocation, or the like, the tag Tg can be associated with the most suitable controller 2, and can avoid the tag Tg from being inoperable.

In another possible configuration, the tag Tg may transmit the search signal when the channel is found to be clear by a carrier sensing; and, when the channel is busy, may later retry the transmission. As a result, the plurality of tags Tg can be efficiently associated synchronously.

It is further more preferable to perform random backoff by generating random numbers.

In this way, the tag Tg transmits the search signal, when having accepted a user operation; when having received a predetermined signal; when the stability of the signal from the controller 2 associated with the tag Tg has become a predetermined state; or when a predetermined time has elapsed.

As described above, the communication system according to the present disclosure may be configured by the entire communication system 10 (refer to FIG. 1) which includes the management server 1, the controller 2, and the tag Tg; may be configured by the management server 1 and the controller 2; or may be configured solely by the management server 1 or solely by the controller 2.

In addition, the channel (frequency channel) according to the present disclosure may also be applied to such communication schemes as a frequency hopping spread spectrum and a direct sequence spread spectrum.

In addition, according to the present disclosure, the channel (operation channel) used to transmit a command to a tag Tg (slave station) by means of a beacon thereby to control the tag Tg (slave station) is different from the channel (search channel) to transmit a search signal. In this way, by using different channels, the normal operation will not be affected.

The present disclosure further includes a channel (announce channel) to transmit a signal instructing association to associate a tag Tg with a controller 2, and the announce channel differs from the operation channel and from the search channel in the present disclosure. In this way, by using different channels, the normal operation will not be affected.

In addition, according to the present disclosure, the tag Tg transmits the search signal to perform association again, when the communication with the first master station associated with the first slave station becomes unstable. As a result, it becomes possible to associate the tag Tg with a better controller 2, to cope with any change in environments such as relocation of the setting location.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. A communication system comprising a management server, a plurality of master stations, and a plurality of slave stations, wherein a first slave station transmits a search signal identifying a first master station which corresponds to the first slave station, each of the plurality of master stations, when having received the search signal, transmits a report to the management server, the report includes identification information of a corresponding master station, identification information of the first slave station, and signal information related to the search signal, the management server determines the first master station, among the plurality of master stations, based on a plurality of reports, including the report, received, respectively, from the plurality of master stations, and associates the first slave station and the first master station with each other, the plurality of master stations performs time-division communication with the plurality of slave stations, and the first slave station transmits the search signal a plurality of times in a time interval, which is longer than a slot time used in the time-division communication.

2. The communication system according to claim 1, wherein the management server further determines the first master station based on stability of the search signal.

3. The communication system according to claim 2, wherein the stability of the search signal is calculated based on a value of a signal strength of the search signal or an average of the signal strength.

4. The communication system according to claim 1, wherein the management server notifies the first slave station of at least an identifier or a channel of the first master station, and the first slave station communicates with the first master station based on at least the identifier or the channel of the first master station.

5. The communication system according to claim 1, wherein a channel in which the first slave station transmits the search signal is different from a channel in which the first slave station communicates with the first master station after being associated with the first master station.

6. The communication system according to claim 1, wherein the first slave station transmits the search signal when:

the first slave station has accepted a predetermined user operation, the first slave station has received a predetermined signal, stability of a signal received from the first master station has become a predetermined state, or a predetermined time has elapsed.

7. The communication system according to claim 1, wherein the management server is one of the plurality of master stations.

8. The communication system according to claim 1, wherein a channel in which a command is transmitted to the first slave station by means of a beacon thereby controlling the first slave station is different from a channel in which the first slave station transmits the search signal.

9. The communication system according to claim 8, wherein a channel, to transmit a signal instructing association to associate the first slave station and the first master station with each other, is further included, and is different from:

the channel in which the command is transmitted to the first slave station by means of the beacon thereby controlling the first slave station, and the channel in which the first slave station transmits the search signal.

10. The communication system according to claim 1, wherein when communication between the first master station and the first slave station becomes unstable, the first slave station transmits the search signal to perform the association again.

11. A communication method performed by a communication system in which a management server, a plurality of master stations, and a plurality of slave stations wirelessly communicate with each other, the communication method comprising:

transmitting, from a first slave station, a search signal identifying a first master station which corresponds to the first slave station;

when the search signal has been received, transmitting, from each of the plurality of master stations, a report to the management server, the report including identification information of a corresponding master station, identification information of the first slave station, and signal information related to the search signal; and determining, by the management server, the first master station, among the plurality of master stations, based on a plurality of reports, including the report, received, respectively, from the plurality of master stations, and associating the first slave station and the first master station with each other, wherein the plurality of master stations performs time-division communication with the plurality of slave stations, and the first slave station transmits the search signal a plurality of times in a time interval, which is longer than a slot time used in the time-division communication.

* * * * *